United States Patent
Wise

[15] 3,671,413
[45] June 20, 1972

[54] NITRATE ION SENSITIVE ELECTRODE
[72] Inventor: Warren M. Wise, Corning, N.Y.
[73] Assignee: Corning Glass Works, Corning, N.Y.
[22] Filed: Jan. 18, 1971
[21] Appl. No.: 107,138

[52] U.S. Cl. .......................................... 204/195 L, 204/1 T
[51] Int. Cl. ............................................................. G01n 27/46
[58] Field of Search ........................................... 204/1 T, 195

[56] References Cited

UNITED STATES PATENTS

| 3,406,102 | 10/1968 | Frant et al. | 204/195 |
| 3,429,785 | 2/1969 | Ross | 204/1 T |
| 3,448,032 | 6/1969 | Settzo et al. | 204/195 |
| 3,483,112 | 12/1969 | Ross | 204/195 |

Primary Examiner—T. Tung
Attorney—Clarence R. Patty, Jr., Clinton S. Janes, Jr. and James A. Giblin

[57] ABSTRACT

An electrode for measuring the concentration of nitrate ions in an aqueous solution wherein the sensing portion is an organic phase containing a high molecular weight quaternary ammonium salt dissolved in a high molecular weight nitrophenyl-type solvent.

4 Claims, 5 Drawing Figures

PATENTED JUN 20 1972 3,671,413

INVENTOR.
Warren M. Wise
BY
James A. Giblin
ATTORNEY

Effect of pH on Sensor's Nitrate Response

INVENTOR.
Warren M. Wise
BY
James A. [signature]
ATTORNEY

INVENTOR.
Warren M. Wise
BY
James A. Giblin
ATTORNEY

NITRATE ION SENSITIVE ELECTRODE

BACKGROUND OF THE INVENTION

Electrodes for determining ion concentrations in aqueous solutions are well known. Electrodes have been designed to measure the concentration of such cations as $H^+$, $Na^+$, $K^+$, $Ag^+$, $Cu^+$, and $Ca^{+2}$ as well as the concentration of such anions as $Cl^-$, $Br^-$, $I^-$, and $F^-$. For any of the above measurements, two electrodes are needed. One electrode is called the sensor and the other is called the reference electrode. In use, the two electrodes are commonly connected to a high impedance potentiometer and then immersed in a test solution. Depending on the construction of the sensor electrode, and the extent of ionic activity in the test solution, an electrochemical cell may develop. The potential of this cell can be read on the potentiometer. Since ionic activity is a measure of ion concentration, the potential reading can be translated into a measure of ion concentration in a given test solution.

The choice of sensor electrode will depend on the type of ion whose concentration is to be determined. In the case of cation concentration determinations, the sensing electrode should be sensitive to cationic activity; contrariwise, where anionic concentrations are to be determined. For a sensor electrode to be usefully sensitive to a particular ion, the electrode must be of such a nature that it senses the activity of that particular ion in preference to the activities of other ions that may be present in the test solution.

The preference of a sensing electrode for certain ions is referred to as the selectivity of the sensor electrode for certain ions over other ions. This selectivity is governed by the tendency of the sensitive portion of the sensor electrode to sense given test ions over other ions at the same concentration. Thus, if the sensitive portion of the sensor electrode is of such composition as to more readily sense the test ion activity, the EMF noted on a potentiometer will be mainly attributable to the test ion activity. This, in turn, provides an indication of test ion concentration.

The dependence of potential change on the activity of the specific ion to be tested follows the well-known Nernst equation for a given concentration range and is related to the physical-chemical characteristics of the electrodes. The Nernst equation shows:

$$E_m = E_o + RT/nF \ln a_1 = E_o + 0.059/n \log a_i \; (25°\,C.)$$

where $E_m$ is the electrode potential, $E_o$ is a constant, $n$ is the ion charge ($\pm$), and $a_i$ is the activity of the specfic ion in solution.

It is apparent from the equation that a change in activity ($a_i$) equivalent to one order of magnitude causes 59 mV potential change when the ion is univalent and about 30 and 20 mV, respectively, when the ion is bivalent or trivalent. Thus, the reliability of a given sensor electrode at given concentrations of a known univalent anion such as $NO_3^-$ (where $n$, the ion charge, is $-1$) can be shown if there is a potential difference of about minus 59 mV for each logarithmic increase in concentration.

PRIOR ART

In practice, the sensitive portion of the sensor electrode is designed in such a way as to limit the manner in which contact is made with the aqueous test solution. Thus, the useful life span of a particular electrode is in no small part determined by how well the sensor material can be prevented from substantially leaving the sensor electrode and undesirably mixing with the aqueous test solution. At the same time, however, care must be taken to assure that the sensor can be brought in contact with an aqueous test solution to provide an interface for sensor-test solution interaction.

There are many well-known methods for accomplishing the above goals. For example, various porous membranes have long been used to keep the sensor phase mechanically separated from the test phase while allowing for electrochemical interaction between the two. Among the more recent methods disclosed is that by Ross (U.S. Pat. No. 3,429,785) wherein various organic ion exchangers in organic solvents are demonstrated as being useful for measuring ion concentrations in aqueous solutions. Being substantially hydrophobic, such organic ion exchange electrodes greatly limit the amount of sensor-solvent leakage into the test solution, thereby prolonging sensor electrode life. Another recent disclosure by Settzo and Wise (U.S. Pat. No. 3,448,032) shows that a liquid organic ion exchange electrode can be made with an organophilic-hydrophobic membrane separating the sensor and test solution.

The above disclosures make clear the importance of maintaining the separation of the sensor and test solutions or at least delaying their rate of mixing.

Hand-in-hand with the problem of maintaining a separation between the sensor and test solution is the problem of providing a sensor electrode that will give Nernstian responses for a particular ion over other ions at the same concentration. Since sensor electrode selectivity for certain ions over others determines the utility of sensor electrodes, it is important that the electrode preference for the ion to be measured be as high as possible over other ions that might be encountered in the test solution.

Although electrodes sensitive to anions such as $NO_3^-$ have been disclosed (e.g. Ross, U.S. Pat. No. 3,483,112), the selectivity for $NO_3^-$ over other anions, especially $Cl^-$ ions, presents a limitation in situations where it is desirable to measure $NO_3^-$ concentration in the presence of varying amounts of $Cl^-$ ions. Further, in spite of the hydrophobicity of such known sensors, there still remains an undesirable amount of sensor-to-test solution leakage. This leakage, as noted, is a limitation on the useful life span of a sensor electrode. Thus, the following discovery was surprising in that it minimizes the above two limitations simultaneously.

SUMMARY OF THE INVENTION

I have now made an electrode which is particularly sensitive to nitrate ions in the presence of chloride and other anions. With this electrode, the selectivity for $NO_3^-$ in the presence of chloride ions in a $10^{-1}$ molar solution is about 150 to 1. Thus, this electrode is capable of measuring nitrate ions in the presence moderate amounts of chloride ions without the necessity for making background corrections. Further, in the optimum combination of sensor and organic solvent, the sensing phase has a relatively high viscosity (e.g., greater than about 100 centipoises) which, in conjunction with its hydrophobicity promotes a longer useful electrode life.

Specifically, I have found the above qualities can be achieved where the electrode for measuring nitrate ion concentrations in aqueous solutions comprises an organic sensor phase containing an ion-exchange material comprising a high molecular weight quaternary ammonium salt dissolved in a high molecular weight nitrophenyl-type compound. Preferably, the molecular weight of the quaternary ammonium salt should be greater than about 400, and the molecular weight of the solvent should be greater than about 200. The sensor and solvent may be contained by any conventional sensor electrode body as long as provision is made for an interface between the sensor phase and the aqueous solution. An internal reference electrode in electrical contact with the sensor must, of course, also be provided. This internal electrode may be of any conventional type such as an Ag/AgCl electrode immersed in a chloride solution which, in turn, is in electrical contact with the sensor phase. To complete the circuit in use, a high impedance potentiometer and a conventional reference electrode such as a saturated calomel reference electrode may be used. Thus, the electrochemical cell can be represented as follows:

Ag/AgCl, Chloride Solution | Sensor Phase | Test Solution | Sat. Calomel

SPECIFIC EMBODIMENTS

The invention may be more clearly understood from the following description taken in conjunction with the accompanying drawings in which.

Figure 1:
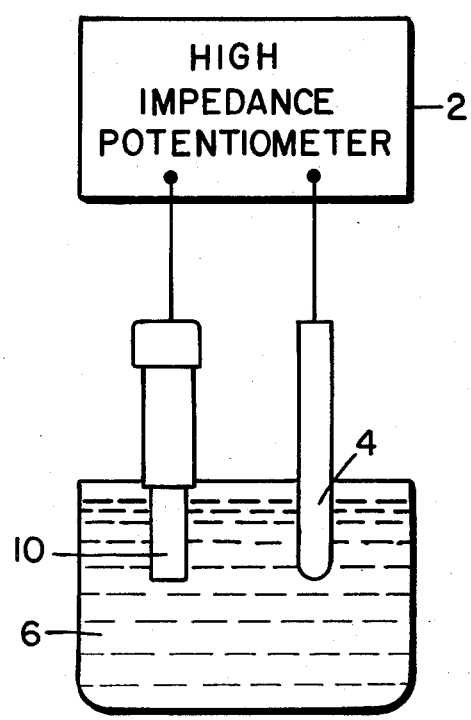
FIG. 1 is a diagrammatic illustration showing a testing circuit of which the present electrode is a part.

Returning to FIG. 1, it can be seen that the electrode of the present invention 10 is in circuit with a potentiometer 2, a reference electrode 4, and a test solution 6. Depending on the ionic activity of test solution 6, an effect on potential will be observed at potentiometer 2.

Figure 2:
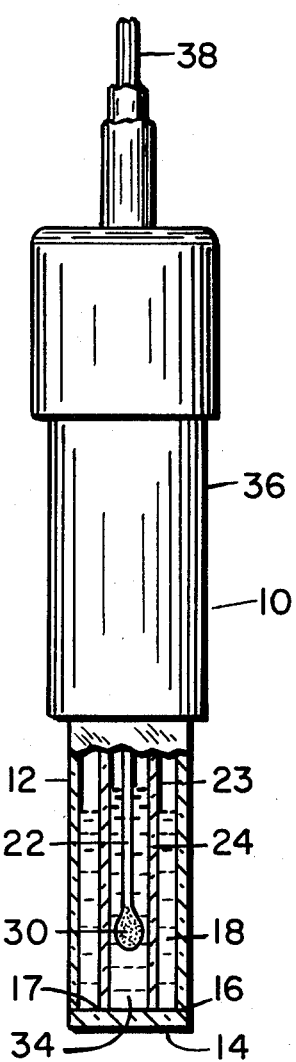
FIG. 2 is a partial cross-sectional view of a representative electrode which can employ the principles of the present invention.

Referring now to the illustration of FIG. 2, the ion exchange electrode 10 embodying the principles of the present invention is comprised of an electrically insulating container such as an outer glass tube 12 having an opening at each end thereof. Only the sensing end of the glass tube 12 is shown in cross section. The sensing end of the tube 12 is tightly capped with a substantially chemically inert porous glass membrane 14 which is attached to the glass tube 12 by a suitable means such as solder glass 16 or directly by a glass-to-glass seal. The interior portion of the glass tube 12 contains the sensor phase material 18 of the present invention, i.e., a high molecular weight quaternary ammonium salt dissolved in a viscous, high molecular weight nitrophenyl-type compound. When assembled, and in actual use, the sensor phase is in contact with and fills the pores of the membrane 14. The high viscosity of the sensor and its solvent and their hydrophobicity, however, greatly minimize any sensor-solvent leakage into the aqueous testing phase. Shown within the sensor phase is an internal reference electrode 23, which is preferably of the Ag/AgCl type. This internal reference electrode 23 consists of an inner glass tube 24 which can be attached directly to the porous glass membrane 14 by means of solder glass 17, a platinum wire 22 with a Ag/AgCl coating 30, and a salt bridge 34 consisting of saturated chloride solution.

The end of the outer glass tube 12 is suitably capped by a lid 36 which acts both as a closure and a support for an electrically conductive lead 38 in electrical contact with the platinum wire 22.

In this particular embodiment, the inner salt solution 34 is separated from the ion exchange liquid 18 by means of the porous membrane 14. The ion-exchange liquid 18 flows downward and laterally into the pores of the membrane 14 and thus comes in electrical contact with both the salt bridge solution 34 and the test solution. The high viscosity of the sensor and solvent 18 severely limits any leakage into either the aqueous phase or the salt solution 34.

It is thought that the sensor electrode senses ion concentrations in the following manner: when the sensor and standard reference electrodes are immersed in the test solution, a circuit is completed. The Ag/AgCl in saturated chloride solution gives rise to a potential. Since the chloride solution is in electrical contact with the aqueous test solution by means of the sensor material, the above potential is affected by the test solution ion activity. This activity is "sensed" at the interface between the sensor material and the aqueous test solution. Since the sensed activity of the test solution is related to its concentration, the effect of the test ions on the potential reflects the test ion concentration. In anion concentration measurements, a greater concentration of anions will affect the potential by a negative factor. Thus, under the Nernst equation, an anion such as $NO_3^-$ will bring about an 59 mV decrease in potential for each logarithmic increase in concentration.

As noted earlier, various anion sensors have been disclosed. However, due to the relatively short life span of electrodes made from such known sensor materials, attention was directed toward finding sensor materials that would simultaneously provide good $NO_3^-$ selectivity and also have a long life.

Many classes of sensor solvents were investigated; however, it was found that high molecular weight nitrophenyl compounds were most suitable when an anion sensitive material such as a quaternary ammonium salt was used as the ion sensor. After certain alkyl-nitrophenyl ether compounds were included in this investigation, it was discovered that these solvents promoted $NO_3^-$ over $Cl^-$ selectivity. Therefore, the following work was done to determine the optimum combination of solute and solvent required for the preparation of a sensor that would display the best characteristics for a $NO_3^-$ electrode. It should be pointed out that sensors and solvents of greater molecular weight than those disclosed immediately below can be used. However, particular attention was given to high molecular weight compounds that can be made from commercially available ingredients.

All electrochemical measurements discussed below were made in unstirred solutions with the nitrate electrodes so made and a saturated calomel-electrode connected to a Corning Model 12 Research pH meter. All reagents were prepared using analytical reagent grade compounds and twice distilled water.

SOLVENTS FOR SENSOR MATERIAL

After it was discovered that certain alkyl-nitrophenyl ether compounds, when used as solvents, promoted $NO_3^-$ over $Cl^-$ selectivity, attention was directed toward discovering the ideal solvent from this class. It was noted that, in general, the ortho alkyl-nitrophenyl ethers have lower melting temperatures than their corresponding meta and para position isomers. Consequently, if the molecular weights of most of the meta and para alkyl-nitrophenyl ethers are sufficiently high for them to be desirably insoluble in water, and have high boiling temperatures, the compounds are usually solids at room temperature. Therefore, since the investigation was concerned with liquid specific ion sensors, most of the attention was given to the ortho derivatives.

The compounds shown in table 1 were prepared by well-known methods.

TABLE I

Some Ethers Prepared for Investigation As Solvents for Liquid Anion Sensors

| Compound | Boiling Temperature, °C. | Pressure, mm. Hg. |
| --- | --- | --- |
| n-octyl-o-nitrophenyl ether | 162 | 2 |
| n-octyl-p-nitrophenyl ether | 183 | 3 |
| | (solid at room temp.) | |
| 3-hydroxylpropyl-o-nitrophenyl ether | 173 | 4 |
| benzyl-o-nitrophenyl ether | 174 | 4 |
| carbethoxymethyl-o-nitrophenyl ether | 160 | 5 |
| n-butyl-o-nitrophenyl ether | 129 | 6 |
| p-chlorobenzyl-o-nitrophenyl ether | (solid at room temp.) | |

Usually, the compounds that were liquids at room temperature possessed high viscosities and densities near 1.

ION EXCHANGE MATERIAL

When certain quaternary ammonium salts were dissolved in the above ethers, anion sensors were obtained. Some salts involved in this investigation that produced useful sensors were:
- trioctylpropylammonium nitrate
- tetraheptylammonium chloride
- tridodecyl-p-chlorobenzylammonium chloride
- triodecylbenzylammonium carbonate
- trioctyl-p-nitrobenzylammonium chloride
- carbethoxymethyltridodecylammonium nitrate, and
- tridodecylhexadecylammonium nitrate When the last salt mentioned in the above list was present in n-octyl-o-nitrophenyl ether, there resulted the best $NO_3^-$ sensor found during the entire investigation. Optimum performance resulted when the concentration of the salt was adjusted to 2 percent (W/V).

The electrolyte for the internal Ag/AgCl electrode should preferably be saturated NaCl solution. If KCl is used, the electrode will display greater than Nernstian responses for all anions at the low concentrations, because alkylnitrophenyl ethers alone have weak $K^+$ responses; but when NaCl is used this behavior is eliminated. Also, the solution should be slightly acidic to prevent the reaction of the $Ag^+$ with the quaternary ammonium salt at the interface of the internal electrolyte and the organic sensor. An accumulation of the products of this reaction is visible as a dark brown residue that has deleterious effects on the electrode's characteristics.

PREPARATION OF SENSOR IN SOLVENT

Before determining that tridodecylhexadeylammonium nitrate dissolved in n-octyl-o-nitrophenyl ether was an ideal sensor, the combination of sensor and solvent was prepared in the following manner:

6 grams of tridodecylhexadecylammonium carbonate were added to 70 ml. of n-octyl-o-nitrophenyl ether, and the mixture was stirred several hours without heating until the solid was completely dissolved. The solution was transferred to a 250 ml. separatory funnel and washed three times with 50 ml. portions of 1 M $NaNO_3$, then twice with distilled water. The organic phase was filtered through two stages of glass wool to remove the water. The filter was washed several times with n-octyl-o-nitrophenyl ether, and the combined filtrate and washings were diluted to 300 ml. with more n-octyl-o-nitrophenyl ether.

ELECTRODE ASSEMBLY

Once the above sensor-solvent preparation was made, the liquid anion-exchange electrodes were assembled and used in a conventional manner. However, to obtain optimum performance of the $NO_3^-$ electrode, it was preferably to use, as its internal electrolyte for the Ag/AgCl electrode, a saturated solution of NaCl containing 0.008 M $HNO_3$ to bring about the desired slight acidity noted above.

Figure 3:
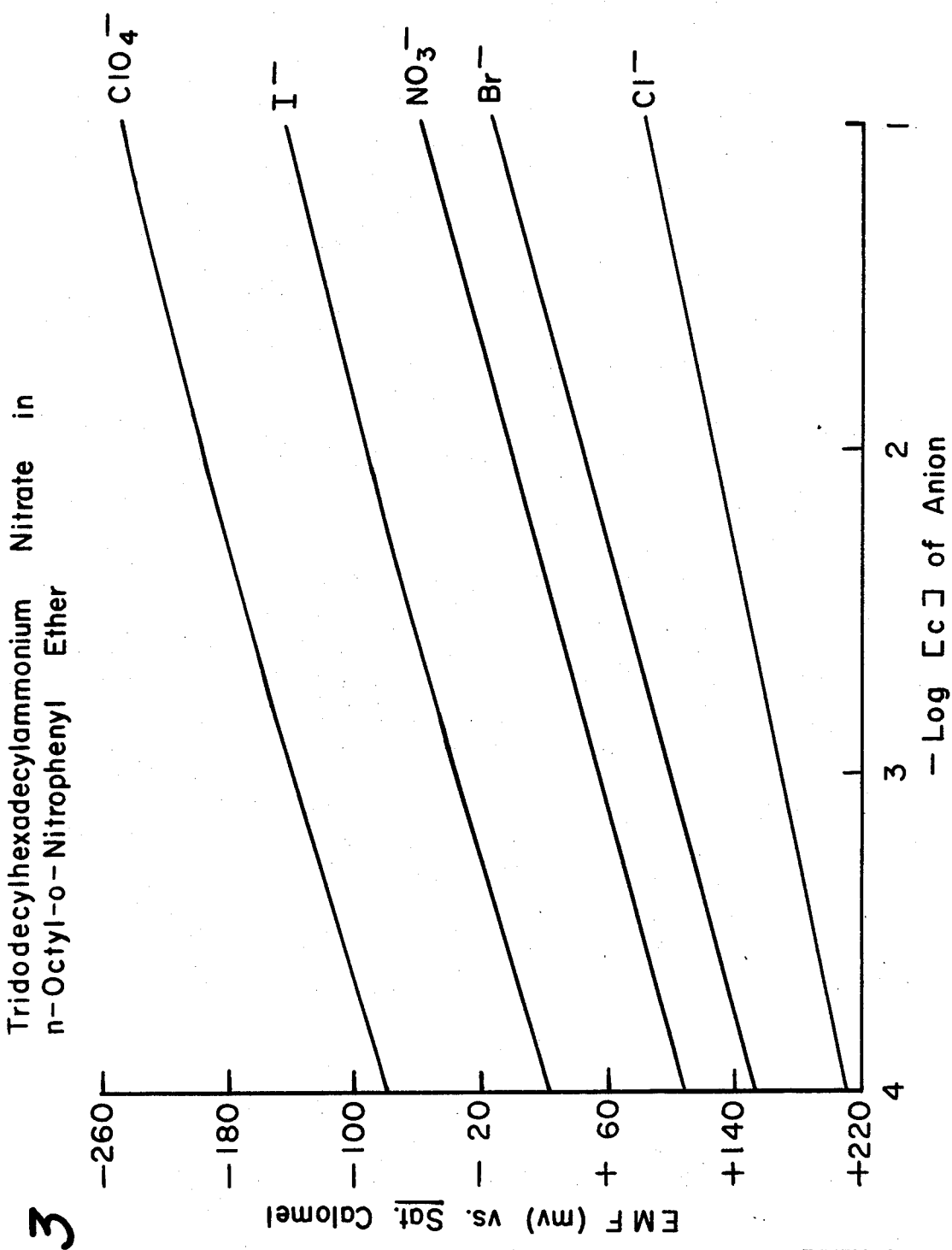
FIG. 3 is a chart showing the relative selectivities for various anions when the high molecular weight quaternary ammonium salt is tridodecylhexadecylammonium nitrate and the high molecular weight nitrophenyl-type solvent is n-octyl-o-nitrophenyl ether.

Once the above electrode was assembled and ready for use, known concentration of perchlorate, iodide, nitrate, bromide, and chloride were found to give Nernstian responses when the sensor comprised tridodecylhexadecylammonium nitrate dissolved in n-octyl-o-nitrophenyl ether. That is, for each logarithmic change in concentration, each of the anions (shown in chart of FIG. 3) brought about a 59 mV change in potential. As shown by the chart of FIG. 3, the electrode was particularly sensitive to $ClO_4^-$ and $I^-$ anions and, as noted, these ions should be absent or extremely minimal when $NO_3^-$ concentrations are being measured. However, as can be seen by the same chart, the selectivity for $NO_3^-$ ions over $Cl^-$ ions was about 150:1 at concentrations of $10^{-1}$ m. This means that in order for the $Cl^-$ ions to establish the same potential as the $NO_3^-$ ions, the concentration of the $Cl^-$ would have to be about 150 times that of the $NO_3^-$. Thus, this greater selectivity for $NO_3^-$ over $Cl^-$ ions requires essentially no background corrections be made when $Cl^-$ ions are present in appreciable quantities.

Figure 4:
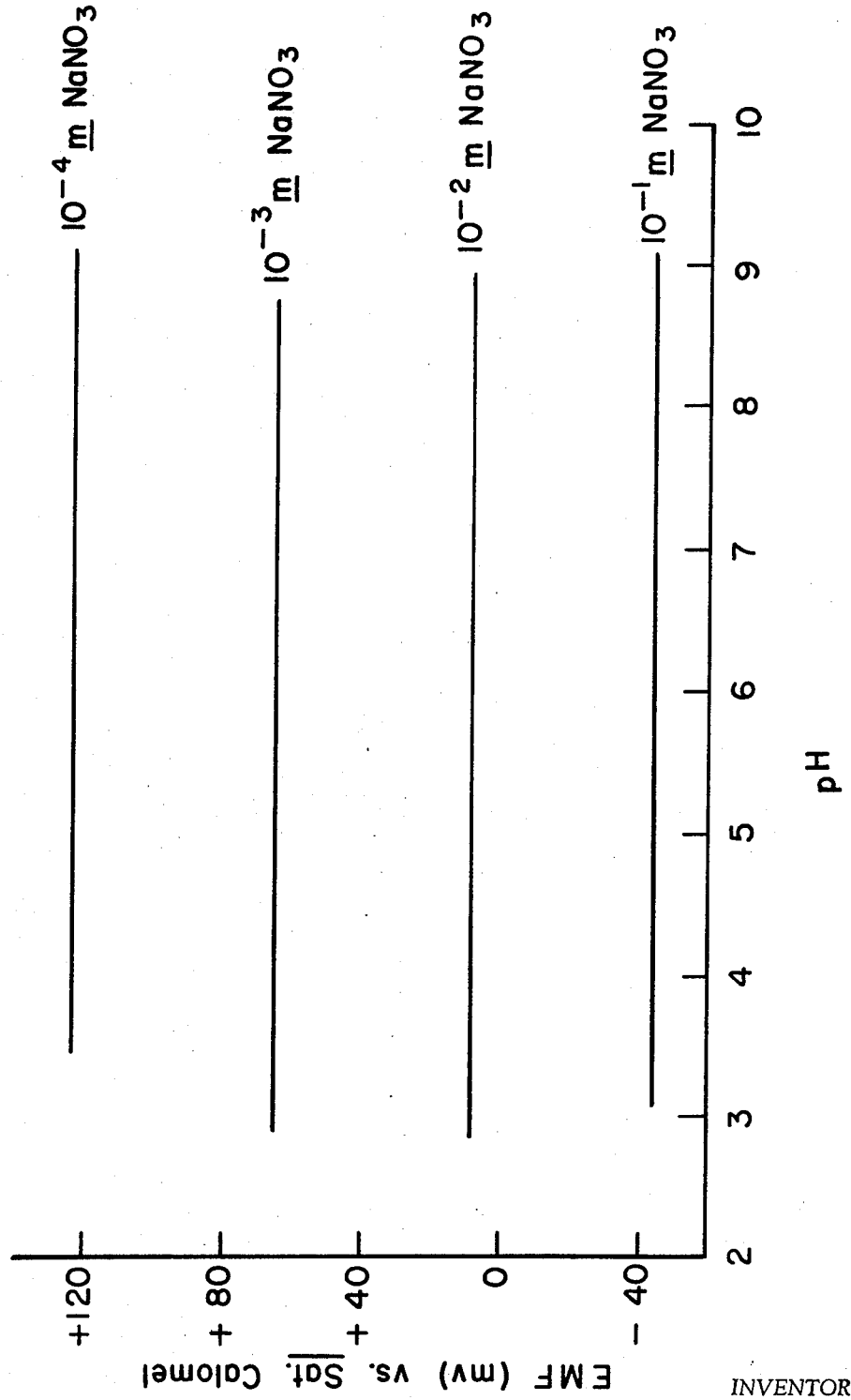
FIG. 4 shows the effect of pH change on the above electrode's nitrate response.
Figure 5:
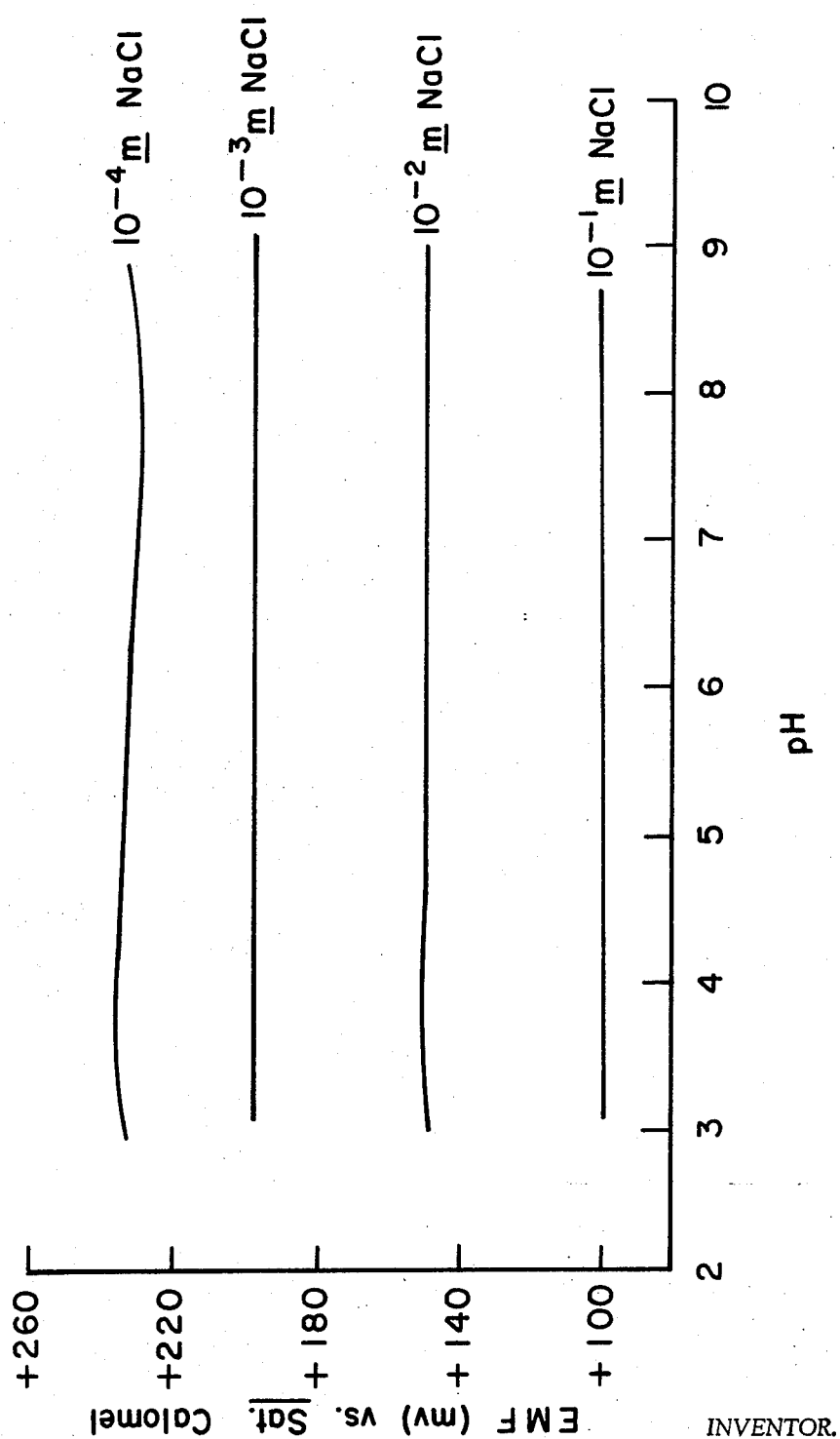
FIG. 5 shows the effect of pH change on the above electrode's chloride response.

A further check on the usefulness of the above electrode was made by checking the responses to both $NO_3^-$ and $Cl^-$ ions when the pH of the test solutions were varied from about 3 to about 9. As can be seen in FIG. 3, variations in pH from about 3 to about 9 had substantially no effect on the sensor responses to $NO_3^-$ concentrations of $10^{-1}$ to $10^{-4}$ M. Likewise, in FIG. 4, the responses of the same concentrations of $Cl^-$ ions, to which the electrode was much less sensitive, were similarly unaffected.

Thus, it can be seen that the electrode of this invention is particularly useful is measuring the concentration of $NO_3^-$ ions in test solutions which include a wide range of $Cl^-$ concentrations, and/or a wide variation in hydrogen ion concentration.

It should be noted that the principles of this invention are not limited to the ideal sensor-solvent combination disclosed above. Any of the high molecular weight quaternary ammonium salts disclosed provided useful sensors when dissolved in a suitable high molecular weight nitrophenyl-type compound in such proportions to produce a sensing solution of relatively high viscosity.

Further, the sensor-solvent combination, disclosed above can be employed in a wide variety of electrode bodies, the only requirement being a means for providing an interface for sensor-test solution contact and a means for internal reference electrode contact with the sensor. The sensor phase of the above electrode need only be the sensor phase of a cell such as the following electrochemical cell:

Ag/AgCl, Chloride Solution | Sensor Phase | Test Solution | Sat. Calomel

The above vertical lines represent material boundaries.

Thus, those skilled in the art will recognize other possible variations. Accordingly, it is intended that this invention be limited in scope only by the appended claims.

I claim:

1. An electrode for measuring the concentration of nitrate ions in an aqueous solution and comprising in combination:
   a. an organic nitrate ion sensor phase comprising a quaternary ammonium salt selected from the group consisting of trioctylpropylammonium nitrate, tetraheptylammonium chloride, tridodecyl-p-chlorobenzylammonium chloride, tridodecylbenzylammonium carbonate, trioctyl-p-nitrobenzylammonium chloride, carbethoxymethyltridodecylammonium nitrate, and tridodecylhexadecylammonium nitrate;
   b. a substantially viscous solvent for the salt of (a) and comprising an alkylnitrophenyl ether having a molecular weight greater than about 200, said solvent being substantially organophilic and hydrophobic;
   c. means for containing the organic sensor phase of (a) in the solvent of (b) so as to provide an interface for ion exchange contact between the materials so contained and the aqueous solution; and,
   d. an internal reference electrode element in electrical contact with the materials contained by (c).

2. The electrode of claim 1, wherein the solvent of (b) is n-octyl-o-nitrophenyl ether.

3. The electrode of claim 1, wherein the quaternary ammonium salt of (a) is tridodecylhexadecylammonium nitrate and the solvent of (b) is n-octyl-o-nitrophenyl ether.

4. The electrode of claim 3, wherein the concentration of the salt of (a) in the solvent of (b) is about 2 percent by weight/volume.

* * * * *